(12) United States Patent
Gargi et al.

(10) Patent No.: US 7,933,172 B2
(45) Date of Patent: Apr. 26, 2011

(54) METHOD FOR PLAYING CONTENTS USING MASTER AND SLAVE OPTICAL DISC

(75) Inventors: Ullas Gargi, San Jose, CA (US); Pere Obrador, Mountain View, CA (US); Peng Wu, San Jose, CA (US); Philip M. Walker, Fort Collins, CO (US); Paul Boerger, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1873 days.

(21) Appl. No.: 11/032,370

(22) Filed: Jan. 10, 2005

(65) Prior Publication Data

US 2006/0153533 A1  Jul. 13, 2006

(51) Int. Cl.
*G11B 21/08* (2006.01)
(52) U.S. Cl. .................. 369/30.09; 707/999.107; 84/609
(58) Field of Classification Search .............. 369/53.2, 369/53.41; 707/100, 101, 104.1, 999.107, 707/999.1, 999.101; 386/95, 125, 126; 84/609
See application file for complete search history.

(56) References Cited

U.S. PATENT DOCUMENTS

| | | | | |
|---|---|---|---|---|
| 5,172,242 A * | 12/1992 | Yamaguchi et al. | .......... | 386/125 |
| 6,476,305 B2 * | 11/2002 | Yamauchi | ......... | 84/609 |
| 7,024,614 B1 * | 4/2006 | Thelin et al. | ................. | 714/770 |
| 7,078,607 B2 * | 7/2006 | Alferness | ........ | 84/609 |
| 7,302,534 B2 * | 11/2007 | Sinclair | ......... | 711/156 |
| 2003/0094093 A1 * | 5/2003 | Smith et al. | .............. | 84/609 |
| 2005/0027933 A1 * | 2/2005 | Iyengar | ............ | 711/112 |
| 2006/0098941 A1 * | 5/2006 | Abe et al. | ............. | 386/52 |
| 2006/0155680 A1 * | 7/2006 | Wu et al. | .............. | 707/3 |
| 2008/0131098 A1 * | 6/2008 | Nishitani et al. | .............. | 386/126 |

OTHER PUBLICATIONS

"The Logical and Application for Blu-ray Disc Rewritable Specifications," Blu-ray Disc Founders, Aug. 24, 2004, 25 pp.

* cited by examiner

*Primary Examiner* — Tan X Dinh

(57) ABSTRACT

Various disc enhancement systems and methods are disclosed. In some embodiments, methods comprise retrieving information from a master optical disc; retrieving a data structure from a slave optical disc; using the information from the master optical disc to modify the data structure; and playing content from the slave optical disc in accordance with the modified data structure.

18 Claims, 4 Drawing Sheets

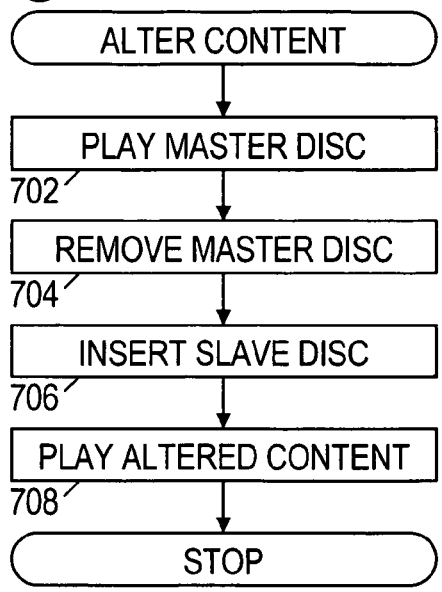

Fig. 7

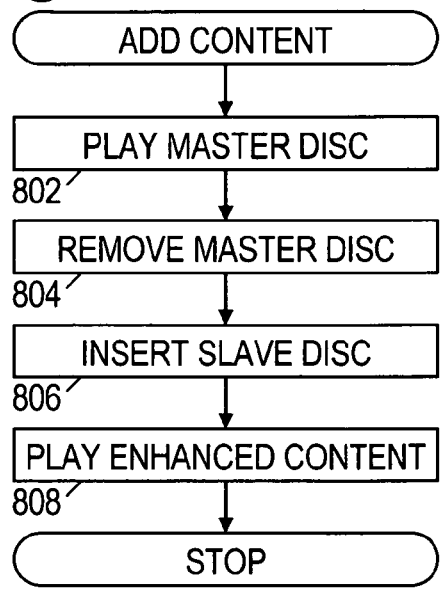

```
<meta>
 <discinfo>
  <title>
   <name>Name Of Disc</name>
   <alternative>Alternative Name Of Disc</alternative>
  </title>
  <description>
   <tableOfContents>
    <titleName titleNumber="1" titleLink="Title1_ID">
     Name Of Movie
    </titleName>
    < titleName titleNumber="2" titleLink="Title2_ID">
     The Making Of The Movie
    </titleName>
   </tableOfContents>
  </description>
  <right>CopyrightOwner</right>                  ,902
  <master slaveID="SlaveDiscID" masterType="Director's Cut"/>
  <slave requiresMaster="no"/>
 </discinfo>                      \904
 <titleinfo>
  ...
 </titleinfo>
</meta>
```

METHOD FOR PLAYING CONTENTS USING MASTER AND SLAVE OPTICAL DISC

RELATED APPLICATIONS

This application relates to abandoned U.S. patent application Ser. No. 11/032,330, entitled "Search File Indicating Languages Associated With Scenes," filed Jan. 10, 2005, and hereby incorporated herein by reference.

BACKGROUND

Film producers and movie studios routinely make shows available to consumers on optical disc for home viewing. To maximize the return on their investment, the movie makers will often produce multiple variations of a movie to encourage repeated viewing and purchasing. For example, after the original version of a movie has been released a studio may release an extended version containing previously omitted footage, or a "director's cut" of the movie that has been edited differently from the original version. With the advent of high-capacity optical discs, it has become possible to include multiple versions of a movie and other bonus material on a single disc.

It is expected that consumers will be largely unwilling to pay a significantly increased price for a single disc having multiple movie versions. Given the consumer's established willingness to pay for incremental changes to their viewing experience, it may be commercially advantageous to be able to individually market different versions of a single disc's content.

BRIEF DESCRIPTION OF THE DRAWINGS

In the subsequent detailed description, reference will be made to the accompanying drawing in which:

FIG. 7 shows a flow diagram of an illustrative content alteration process;

FIG. 8 shows a flow diagram of an illustrative content supplementation process; and FIG. 9 shows an illustrative library file having illustrative master and slave elements.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the terms "couple" or "couples" and "connect" or "connects" are intended to mean either an indirect or direct electrical connection. Thus, if a first device couples or connects to a second device, that connection may be through a direct electrical connection, or through an indirect electrical connection via other devices and connections.

As used herein, the term "master" refers to a disc or other information storage medium or source that is capable of modifying the playback of another disc or other information storage medium. The term "slave" refers to a disc or other information storage medium that may have its playback modified by another, master disc or other information storage medium. These terms are not necessarily exclusive, as a disc may be a slave to another disc and a master to a third disc. Nor is there any restriction to the number of discs that may be master to a given disc, or conversely, to the number of discs that may be slave to a given disc.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be illustrative of that embodiment, and not intended to suggest that the scope of the disclosure, including the claims, is limited to that embodiment.

Figure 1:
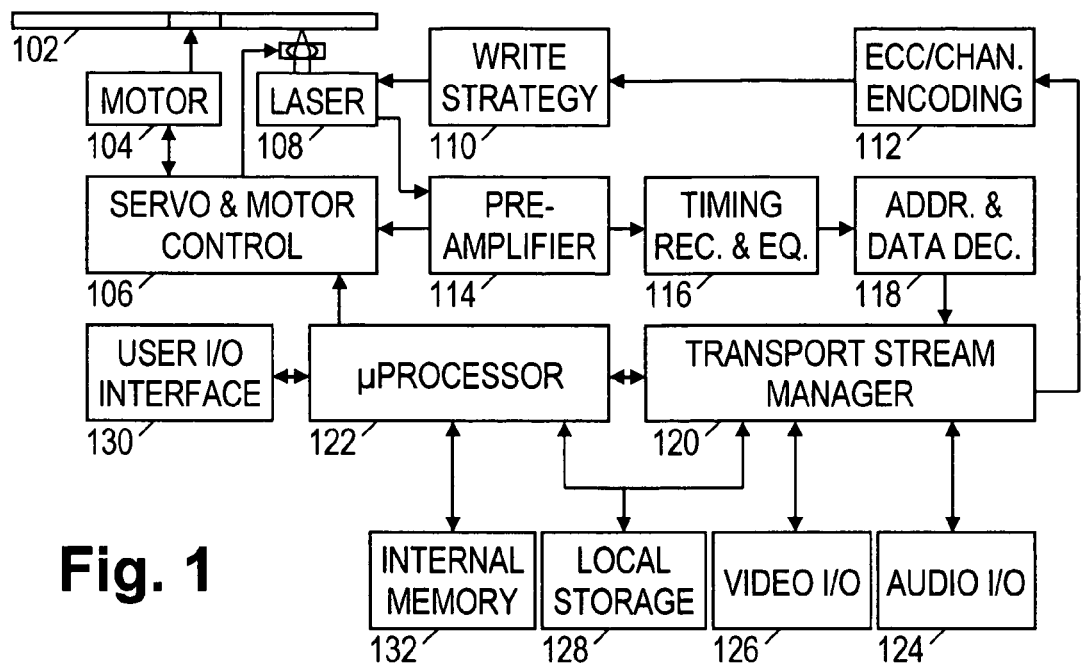
FIG. 1 shows a block diagram of an illustrative optical disc player.

FIG. 1 shows an illustrative optical disc player. In the player, an optical disc 102 is rotated by a motor 104. The motor's rotation rate is controlled by controller 106, which also controls the read/write position of laser 108. Laser 108 reads data from optical disc 102, and if the optical disk is recordable, the laser can write data to the optical disc. Laser 108 receives encoded write data from write strategy module 110, which compensates for nonlinearities in the laser's write performance. The encoded write data is provided to write strategy module 110 by encoder module 112. Encoder module 112 encodes a write data stream using error correction code (ECC) and channel encoding strategies to respectively protect against data recovery errors and ensure compatibility with the physical storage medium.

Laser 108 detects changes in reflected light intensity to read data from optical disc 102. Laser 108 provides a read signal to pre-amplifier 114, which amplifies the signal and provides it to module 116 for timing recovery and equalization. Pre-amplifier 114 further provides a tracking error signal that controller 106 uses for feedback control of the read/write position of laser 108. Timing and equalization module 116 provides an equalized read signal to address & data decoder 118. The decoder forms one or more read data streams from the address and data information extracted from the read signal. A transport stream manager 120 operates under control of microprocessor 122 to direct, multiplex, and de-multiplex data streams to and from various components. Transport stream manager 120 receives a data stream from decoder 118, de-multiplexes the data stream into component streams, and directs the component streams as appropriate to audio block 124, video block 126, local storage 128, and microprocessor 122. Manager 120 further accepts one or more component streams from audio block 124, video block 126, local storage 128, and microprocessor 122, multiplexes the one or more component streams into a single write data stream, and directs the write data to encoder 112.

Audio block 124 is an interface for audio output and audio input. Accordingly, audio block 124 may be configured to connect to speakers and headphones, and may be further configured to receive a line input or audio input from another source. (The audio block 124 is optional and may be omitted in some embodiments.)

Video block 126 is an interface for video output and video input. Accordingly, video block 126 may be configured to connect to a television monitor, or video screen, and may be further configured to receive video input from an external source.

Local storage 128 is a persistent information storage device, and may take the form of a disk drive, solid state device, or other large capacity storage device. Local storage 128 may be used to build an information library regarding optical discs that have been played, and may further be used to store content from one or more of the optical discs for later playback without the disc.

Microprocessor 122 coordinates the operation of the various player components in response to input from user interface 130. The user interface 130 may comprise various lights, buzzers, and digital displays for providing status information and feedback to the user. The microprocessor's operation is determined by software stored in internal memory 132. Internal memory 132 serves also as a data cache for the microprocessor's operations.

Figure 2:
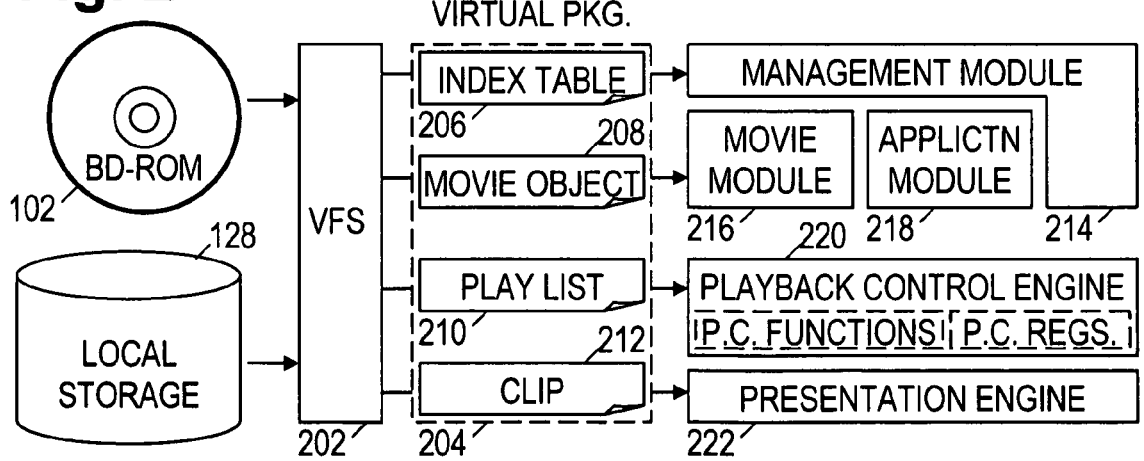
FIG. 2 shows a block diagram of an illustrative software architecture for an optical disc player.

The software executed by microprocessor 122 may be represented with a software architecture diagram. FIG. 2 shows an illustrative software architecture diagram having blocks for a virtual file system (VFS) module 202, a management module 214, a movie module 216, an application module 218, a playback control engine 220, and a presentation engine 222. When an optical disc 102 is inserted in the disc player, the VFS module 202 creates a virtual package 204.

Virtual package 204 is constructed from disc content combined with stored information from local storage 128 (or in the absence of local storage 128, stored information from internal memory 132). The virtual package 204 represents the contents of a virtual disc. The use of a virtual package 204 allows for modification of an optical disc's operation with no modification to the optical disc itself. In the absence of stored information, the virtual package 204 will be identical to the contents of optical disc 102.

Virtual package 204 comprises an index table 206, one or more movie objects 208, one or more play lists 210, and one or more clips 212. The index table 206 is a table that defines a top-level menu and identifies the titles on the disc. The menu and titles are identified in terms of the movie object(s) that implement the menu or launch playback of the title. The index table further specifies a movie object or application to be automatically played when a disc is inserted into the player.

A movie object 208 is a navigation program that initiates playback of a play list and/or interacts with a user to select a play list or another movie object. A play list 210 is an ordered collection of playing intervals in the clips. The playing intervals are specified in terms of a start point and an end point in a given clip. A clip 212 is an audio-visual stream file ("clip stream file") together with associated database attributes ("clip information file"). The clip stream file may be, for example, an MPEG-2 transport stream as provided in ISO/IEC 13818-1, and it may comprise multiplexed video, audio, graphics, and text streams. The clip information file identifies time-stamped access points to the clip stream file.

Management module 214 controls the top-level operations of the player, including determining which movie objects are to be executed and initiating execution of those movie objects associated with menus and titles. Movie module 216 is called by management module 214 to execute a given movie object. Movie module 216 calls playback control engine 220 with the play lists to be displayed. Playback control engine 220 also responds to commands by management module 214 for "trick play" modes such as fast-forward, pause, rewind, restart, and jump-to-next-scene. These modes are initiated via the playback control functions and playback control registers embedded within the playback control engine 220. Playback control engine 220 causes presentation engine 222 to retrieve clips 212 and play the clip content to the user via video screens and speakers.

Application module 218 is provided for executing software content from the disc. This module will not be discussed further here.

Figure 3:
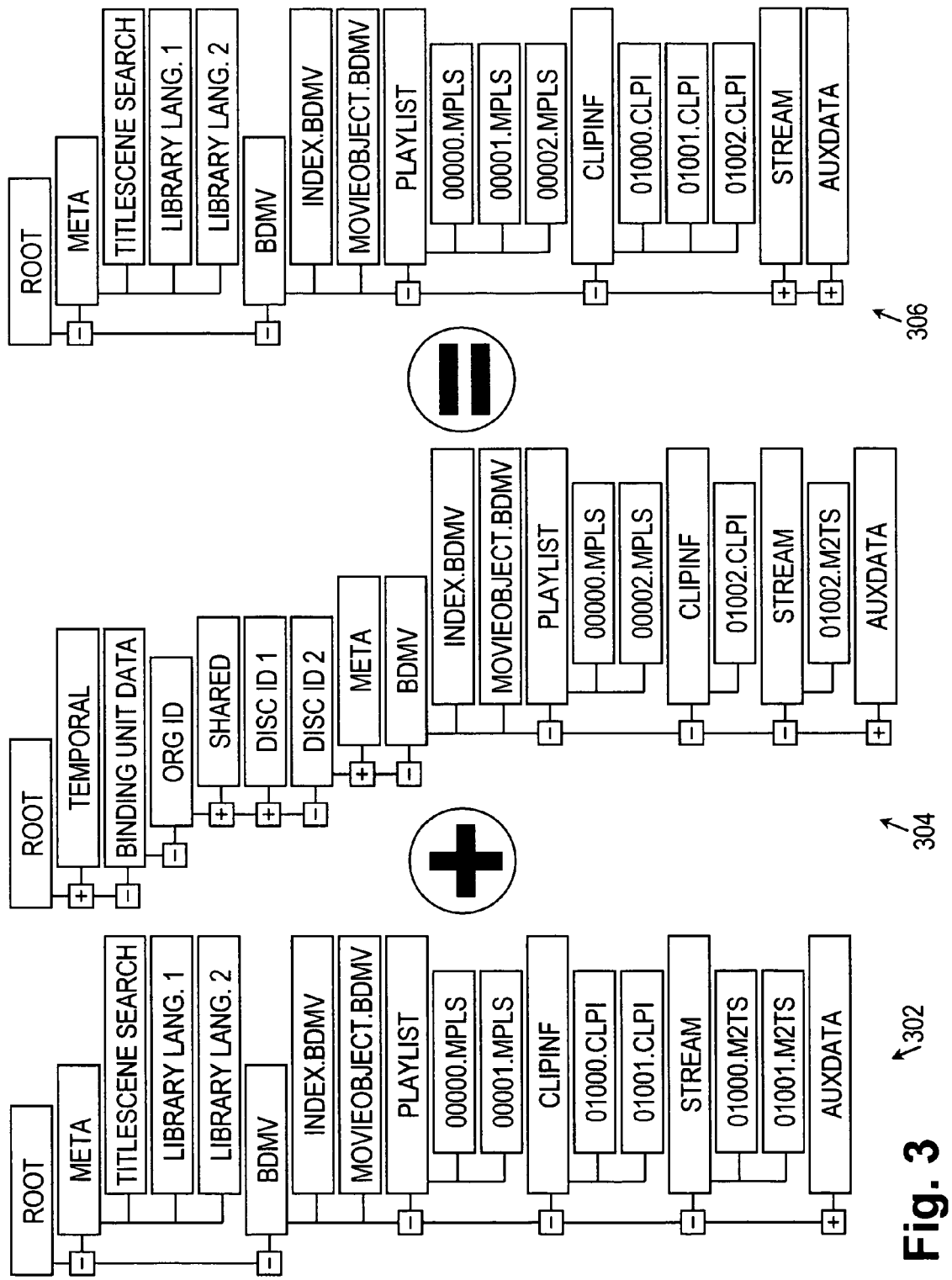
FIG. 3 shows illustrative data structures being combined in an illustrative data structure binding process.

FIG. 3 shows illustrative data structures that may be operated on by the VFS module 202. Specifically, VFS module 202 may combine the optical disc's data structure 302 with the player's stored data structure 304 to provide the virtual package's data structure 306. (This combining process is sometimes called "binding.") The data structures shown here are file system structures, in that directories and files are shown. However, the files too are structured, so the data structures actually contain many more levels than what is shown here.

Data structure 302 begins with a top-level root directory that contains two subdirectories, Meta (short for metadata) and BDMV (short for Blu-Ray Disc Movie). The illustrative meta directory contains a TitleScene Search file and two Library files. The TitleScene Search file provides descriptive information for each scene on the disc to enable versatile content searches. The Library files are language-specific, and each library file comprises catalog information for the disc. The library files provide such information as the disc title, a description of the disc, a table of contents for the disc, whether the disc is part of a set, copyright license rights, release date, creator, publisher, format, genre, audio track language, ratings, and sources for additional information.

The BDMV directory comprises an index file, a movie object file, and four subdirectories: Play List, ClipInf, Stream, and AuxData. The index file is the source of the index table 206 described previously. The movie object file is the source of the movie objects 208 described previously. The Play List directory comprises a file for each play list, the files being named with a five-digit play list identifier. The ClipInf directory comprises the clip information files described previously, and the Stream directory comprises the clip stream files described previously. (There is a one-to-one correspondence between the clip information files and the clip stream files.) The AuxData directory contains sound files and font files for graphics screens (such as menus).

Data structure 304 is a more extended data structure, but it largely resembles the optical disc's data structure 302. The root directory comprises a temporal subdirectory for caching temporary files, and further comprises a binding unit data subdirectory. This subdirectory contains "binding unit data," that is, data that is intended to be combined with data from a given optical disc whenever that disc is played. The binding unit data directory comprises an organization identifier subdirectory to organize data according to optical disc publishers. Each organization identifier subdirectory may comprise disk-specific subdirectories named with the corresponding disk identifiers, and may additionally or alternatively comprise a Shared subdirectory for data to be used with multiple discs.

Within a shared subdirectory or a disc-specific subdirectory, the data structure parallels the optical disc data structure, with Meta and BDMV directories as previously described. Within these directories are included only those files that are used to replace, modify or supplement disc content. Thus, in data structure 304, a new index file and movie object file have been provided, as have a replacement play list, a supplemental play list, a new clip information file, and a new stream file.

In general, it is contemplated that when the binding unit data for a given disc comprises a file that is identically named to an existing file on the disc, the file from the binding unit data will be used in place of the disc file. For example, a binding unit data file named 00000.MPLS would be used in place of a disc file of the same name. If a binding unit data file starts with the same identifier as (but is not identically named with) a disc file, the binding unit data file will be merged with the disc file. For example, a binding unit data file named 00001.00.MPLS would be merged with a disc file named 00001.MPLS. If a binding unit data file is provided without a corresponding disc file, the binding unit data file is simply added to the virtual package. The virtual package's data structure 306 reflects these changes, although the contents of the stream subdirectory are not expressly shown in the figure.

Figure 4:
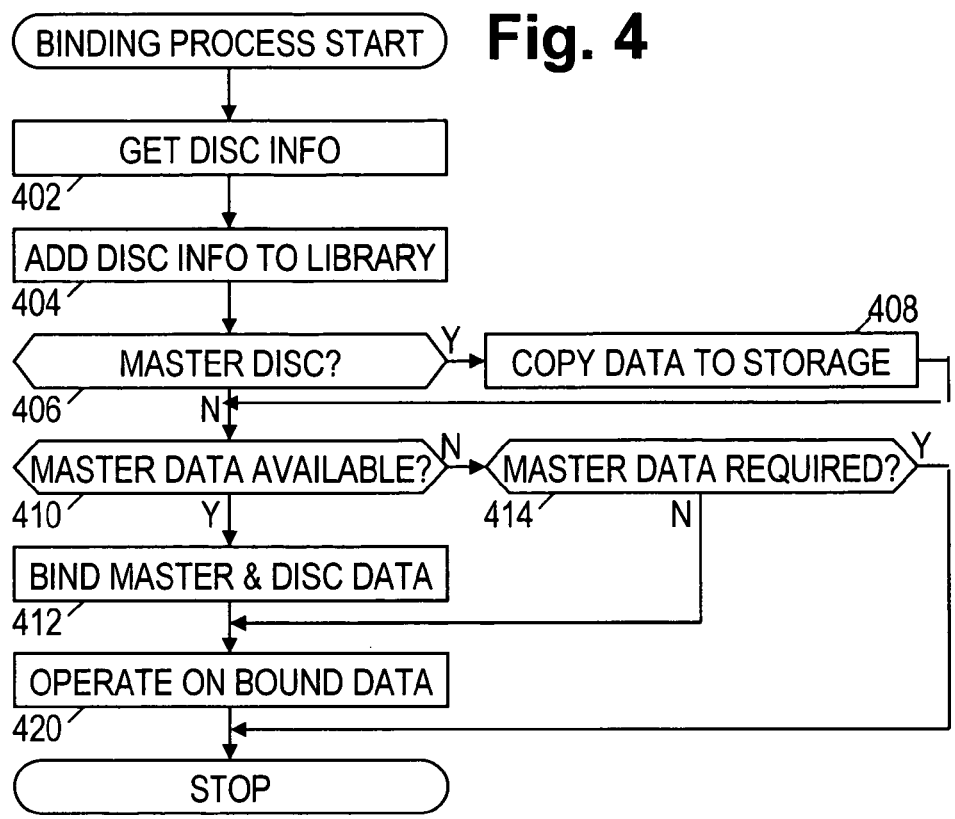
FIG. 4 shows a flow diagram of an illustrative binding process.

FIG. 4 shows a flow diagram of an illustrative combining process that may be performed each time an optical disc is inserted in the player. The player begins in block 402 by obtaining a library file from the disc. In block 404, the library file information (if not already present) is added to a library catalog in memory 132 and/or in local storage 128.

An illustrative library file is described further below with reference to FIG. 9. For the moment, it is sufficient to note that the library file may specify whether the optical disc is a master disc or a slave disc. In block 406, the player determines whether the optical disc is a master disc. If so, then in block 408 the player transfers binding unit data to internal memory and/or local storage.

Whether or not the optical disc is a master disc, the player checks in block 410 to determine whether building unit data has been stored for modifying the playback of the optical disc. If so, in block 412 the player combines the stored data structure with the optical disc's data structure to form a virtual package data structure. Otherwise, in block 414, the player determines whether the optical disc requires the use of a master disc. If a master disc is required (and the data from the master disc is not present), the player halts playback, optionally displaying an error message.

If the master disc data is present or if a master is not required, the player operates on the virtual package in block 420. Depending on the virtual package content, the operation may be playback of a movie title or execution of a software package.

The master/slave concept allows for post-purchase modification of a slave disc's operation. The post purchase modification may take several forms, comprising: 1) unlocking of previously unavailable content; 2) locking of previously available content; 3) altering the content; and 4) supplementing the content. Each of these forms may enhance the value of a purchased disc, and hence may allow publishers to increase revenue by selling master discs to carry out these modifications.

Figure 5:
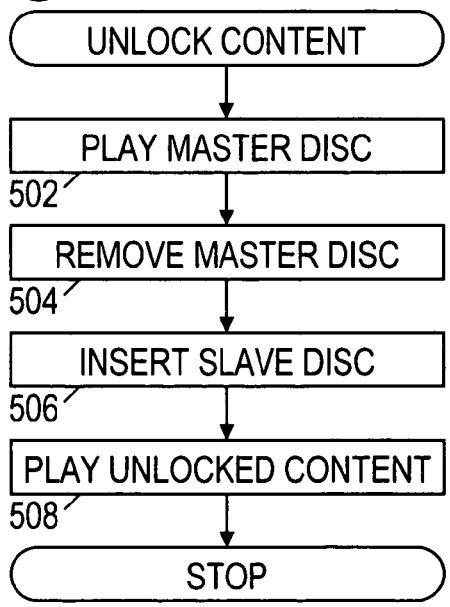
FIG. 5 shows a flow diagram of an illustrative content unlocking process.

FIG. 5 shows an illustrative flow diagram for unlocking previously unavailable content. A slave disc, when sold, may comprise content that is not initially available to the purchaser. For example, a publisher may store multiple movie versions, such as a alternative "cuts" (e.g., a director's cut) and different language versions of the movie. As another example, the publisher may include "bonus material" such as behind-the-scenes interviews, commentary, deleted material, and out-takes. Mastering all such materials on a single disc may cost less than mastering multiple disc versions. The publisher may then provide master discs designed to unlock selective portions of the content. For example, a language master disc may be provided to unlock a certain language version of the movie, or a director's cut master disc may unlock a director's cut.

As indicated in FIG. 5, the unlocking process begins in block 502 with playing the master disc in the player. The player transfers to internal memory or local storage a set of binding unit data that may comprise a new index file and movie object file to make the previously unavailable slave disc content accessible to the player. In some embodiments, the binding unit data may comprise a decryption key.

In block 504 the master disc is removed from the player, and in block 506 a slave disc is inserted. When the slave disc is inserted, the player combines the binding unit data with the data from the slave disc, making previously unavailable content accessible by the player. Thus in block 508, the player can play the unlocked content.

Figure 6:
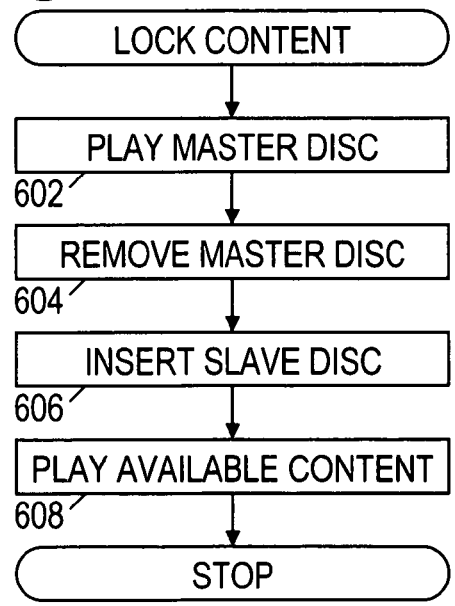
FIG. 6 shows a flow diagram of an illustrative content locking process.

FIG. 6 shows an illustrative flow diagram for locking previously available content. A slave disc, when sold, may comprise a wide variety of accessible content. As previously noted, multiple versions of a movie may be present, as may put-takes and other bonus material. Some of this material may be suitable for young viewers, while other material may not. The publisher may provide master discs designed to lock selective portions of the content. For example, a rating master disc may be provided to make selected portions of the content inaccessible.

As indicated in FIG. 6, the unlocking process begins in block 602 with playing the master disc in the player. The player transfers to internal memory or local storage a set of binding unit data that may comprise a replacement index file and movie object file to make the previously available slave disc content inaccessible to the player.

In block 604 the master disc is removed from the player, and in block 606 a slave disc is inserted. When the slave disc is inserted, the player combines the binding unit data with the data from the slave disc, making previously available content inaccessible by the player. Thus in block 608, the player can play the accessible content, but is prevented from playing the locked content.

FIG. 7 shows an illustrative flow diagram for altering content. A master disc may be designed to re-order the playback of existing material. For example, the publisher may wish to create a master disc that alters the playback of a slave disc to convert a movie into a music video or soundtrack album.

As indicated in FIG. 7, the altering process begins in block 702 with playing the master disc. The player transfers to internal memory or local storage a set of binding unit data that may comprise a replacement play lists to alter the playback of the disc content.

In block 704 the master disc is removed from the player, and in block 706 a slave disc is inserted. When the slave disc is inserted, the player combines the binding unit data with the data from the slave disc, altering the playback method. Thus in block 708, the player plays the content of the disc in an altered fashion.

FIG. 8 shows an illustrative flow diagram for adding content. A publisher may develop enhancements for a slave disc after the slave disc has already been published. For example, a publisher may wish to add search options, pop-up trivia or commentary, game software, or user interface enhancements. A master disc may be designed to provide these enhancements for use in the playback of content on the slave disc.

As indicated in FIG. 8, the altering process begins in block 802 with playing the master disc. The player transfers to internal memory or local storage a set of binding unit data that may comprise a additional content to enhance the playback of the slave disc's content. In block 804 the master disc is removed from the player, and in block 806 the slave disc is inserted. When the slave disc is inserted, the player combines the binding unit data with the data from the slave disc. Thus in block 808, the player plays the content of the disc in an enhanced fashion.

The library file discussed above relative to FIG. 4, is now described in more detail. The library file may be structured using the extended markup language (XML). An XML file comprises elements that are delimited by tags. The tags identify the elements, and may further comprise attribute values associated with the elements. An element's content appears between its delimiters, and nested structures are permitted. White space, i.e., tabs, spaces, and line breaks, are largely ignored except as may be needed within a tag to separate an element's name from any attribute values that may be specified.

An illustrative library file is shown in FIG. 9. Note that the tags are identified with angle brackets < >, and the tags generally provided in pairs, e.g., the <meta> tag and the </meta> tag delimit the contents of the meta element. The exception to this rule occurs for empty elements such as the master element 902. An empty element is an element with nothing between the delimiters, e.g., <master></master>. Such a construction may be abbreviated as <master />.

Attributes for an element are included between the angle brackets and after the element name. Attributes are specified using an equals sign. The attribute name appears on the left side of the equals sign, and the attribute's value appears in quotes on the right side of the equals sign. For example, the master element 902 is shown having two attributes: slaveID and masterType.

The library file provides information regarding the disc and its content. The structured metadata appears in the meta element between the <meta> and </meta> delimiters. The metadata comprises the discinfo element and one or more titleinfo elements. The discinfo element provides information about the disc as a whole, while the titleinfo elements contain information specific to each title on the disc.

The discinfo element comprises a title element to specify the disc's title (and any alternative titles for the disc). The discinfo element further comprises a description element that may provide a table of contents for the disc with links to the various titles. The discinfo element may also comprise a right element to identify the disc's copyright owner.

The discinfo element may further comprise a slave element 904 and one or more master elements 902. The function of the slave element 904 is to identify the disc as a slave disc. In some embodiments, the player will not combine data from local storage with disc content if the slave element is absent. The slave element may specify a "requiresMaster" attribute value as either "yes" or "no." The default value may be "no." If the requiresMaster attribute value is "yes" the disc may not be permitted to play in the absence of data from a master disc. (This might be the case, for example, where the publisher wishes to use master discs to control license rights.)

The function of the master element 902 is to identify the disc as a master disc. The slaveID attribute of the master element is set equal to an identifier of the slave disc for which the master disc is intended. In some embodiments, the identifier is allowed to include wildcard characters so that the master disc can apply to multiple slave discs. The masterType attribute serves to identify the purpose of the master disc. In the example shown, the masterType is set to be indicative of a director's cut, so after the master disc has been played, the slave disc should exhibit a director's cut of the movie.

The slave disc may be a legacy media type that does not include a library file or other similar data structure. The slave disc can be optical, magnetic, magento-optical, or other type. To accommodate such discs, which might not have a slave element that specifies a slaveID, the slaveID attribute of the master element 902 may be allowed to reference any information on a slave disc. For example, the slaveID attribute might reflect copyright information, title information, publication date information, and combinations thereof.

The above discussion is meant to be illustrative of the principles and various embodiments of the present invention. Numerous variations and modifications will become apparent to those skilled in the art once the above disclosure is fully appreciated. For example, the foregoing description was made in the context of optical discs, but the disclosed material is equally applicable to other forms of information storage. Some player embodiments may include a network interface configured to retrieve binding unit information via a network. It is intended that the following claims be interpreted to embrace all such variations and modifications.

What is claimed is:

1. A method of playing disc content, the method comprising:
   retrieving information from a master optical disc, the information comprising binding unit data;
   retrieving a data structure from a slave disc, the data structure defining a first order of playback of audio-visual content from the slave disc;
   combining the binding unit data with the data structure to create a virtual disc including a modified data structure defining an order of playback of the audio-visual content stored on the slave disc that is different from the first order of playback; and
   playing the content from the slave disc in accordance with the modified data structure.

2. The method of claim 1, wherein the modified data structure makes available more content than the original data structure.

3. The method of claim 1, wherein the modified data structure makes available less content than the original data structure.

4. The method of claim 1, wherein the data structure comprises a set of files, and wherein the information from the master optical disc comprises replacements for one or more files in the data structure.

5. The method of claim 1, wherein the data structure comprises a set of files, and wherein the information from the master optical disc comprises one or more files to be added to the data structure.

6. The method of claim 1, wherein the data structure comprises a set of files, and wherein the information from the master optical disc comprises one or more files to be merged with corresponding files in the data structure.

7. The method of claim 1, further comprising:
   storing the information in a persistent storage device; and
   using the information to modify the data structure whenever the slave disc is played.

8. A method of playing read-only media content in a modifiable manner, the method comprising:
   retrieving a data structure from a read-only medium;
   playing content from the read-only medium in accordance with the data structure;
   storing information from a master medium in persistent storage;
   retrieving the data structure from the read-only medium;
   combining the data structure with the information from the master medium, thereby creating a virtual disc including a modified data structure defining an order of playback of audio-visual content stored on the slave disc that is different from the order of playback defined by the data structure read from the read-only medium; and playing the content from the read-only medium in accordance with the modified data structure.

9. The method of claim 8, wherein the data structure comprises one or more play lists to make read-only medium content accessible.

10. The method of claim 9, wherein the modified data structure comprises at least one additional play list to make additional read-only medium content accessible.

11. The method of claim 9, wherein the modified data structure comprises at least one modified play list that renders previously accessible content inaccessible.

12. The method of claim 9, wherein the modified data structure comprises at least one play list that reorders content playback.

13. The method of claim 8, wherein the master medium and the read-only medium are optically-readable discs.

14. A player apparatus that comprises:

reader means for retrieving data from master information storage media;

storage means for persistently storing information locally; and processor means coupled to the reader means and the storage means, said processor means for accessing master information storage media via the reader means, for storing in said storage means binding unit data retrieved from master information storage media, and for combining the binding unit data from said storage means with a data structure from slave information storage media that defines a first order of playback of content from the slave information storage media to create a virtual disc including a modified data structure defining an order of playback of the content stored on the slave disc that is different from the first order of playback.

15. The player apparatus of claim 14, further comprising:

audio-video means for coupling the player to means for hearing and viewing content from the slave information storage media.

16. The method of claim 1, wherein operations performed during the combining are determined by file names included in the binding data.

17. The method of claim 8, wherein the virtual disc includes all the stored information from the META and BDMV directories of the master medium and all files of the read-only medium not replaced by the information from the master medium.

18. The player apparatus of claim 14, wherein the virtual disc provides an order of playback of content from the slave information storage media different from any order provided by a playlist stored on the slave information storage media and any order provided by a playlist stored on the master information storage media.

* * * * *